US007533045B1

(12) United States Patent  (10) Patent No.: US 7,533,045 B1
Lange et al.  (45) Date of Patent: May 12, 2009

(54) METHOD AND SYSTEM FOR LIFE SETTLEMENT AND LIFE INSURANCE CONTRACTS SECURITIZATION INVOLVING ASSET AND LIABILITY STRIPPING

(75) Inventors: Jeffrey S. Lange, New York, NY (US); Jonathan M. Lewis, New York, NY (US); Steven M. Shapiro, New York, NY (US)

(73) Assignee: JJS IP Holdings LLC, New York, NY (US)

( * ) Notice: Subject to any disclaimer, the term of this patent is extended or adjusted under 35 U.S.C. 154(b) by 764 days.

(21) Appl. No.: 10/640,124

(22) Filed: Aug. 13, 2003

(51) Int. Cl.
  *G06Q 40/00* (2006.01)
(52) U.S. Cl. .......................... 705/35; 705/1; 705/36 R; 708/130; 708/131; 708/160; 902/39; 902/40; 902/41
(58) Field of Classification Search ............... 705/36 R, 705/1, 35; 708/130–131, 160; 713/39–41
  See application file for complete search history.

(56) References Cited

U.S. PATENT DOCUMENTS

| 5,429,506 | A | * | 7/1995 | Brophy et al. ............... 434/107 |
| 5,550,734 | A | | 8/1996 | Tarter et al. |
| 5,974,390 | A | | 10/1999 | Ross |
| 6,088,685 | A | * | 7/2000 | Kiron et al. ............... 705/36 R |
| 6,192,347 | B1 | | 2/2001 | Graff |
| 6,321,212 | B1 | | 11/2001 | Lange |
| 6,330,541 | B1 | | 12/2001 | Meyer et al. |
| 6,336,103 | B1 | | 1/2002 | Baker |
| 6,654,727 | B2 | * | 11/2003 | Tilton ....................... 705/36 R |
| 2001/0047325 | A1 | | 11/2001 | Livingston |
| 2002/0046144 | A1 | | 4/2002 | Graff |
| 2002/0091610 | A1 | | 7/2002 | Smith |
| 2002/0103667 | A1 | | 8/2002 | Jannah et al. |
| 2003/0083975 | A1 | | 5/2003 | O'Grady et al. |
| 2003/0088444 | A1 | | 5/2003 | Garbin et al. |
| 2004/0064391 | A1 | | 4/2004 | Lange |
| 2004/0177021 | A1 | | 9/2004 | Carlson et al. |
| 2004/0181475 | A1 | | 9/2004 | Haroon |
| 2004/0199446 | A1 | | 10/2004 | Lange |
| 2004/0267647 | A1 | | 12/2004 | Brisbois |
| 2005/0071205 | A1 | | 3/2005 | Terlizzi et al. |
| 2005/0086156 | A1 | | 4/2005 | Conroy et al. |

OTHER PUBLICATIONS

Bergman, Sten, "CDO Evaluator and Portfolio Benchmarks," The Securitization Conduit, vol. 5, Nos. 1-4, 2002, pp. 38-51.*
Cummins, J. David "Securitization Opportunities for Life Insurers," TIAA-CREF Conference on Fair Value Accounting, May 16, 2003.*

(Continued)

*Primary Examiner*—Mary Cheung
*Assistant Examiner*—Brian Fertig
(74) *Attorney, Agent, or Firm*—Greenberg Traurig, LLP

(57) ABSTRACT

One embodiment of the present invention provides a means of securitization of life settlement contracts using a method of stripping the death benefit asset from the premium liabilities by producing a Stripped Collateralized Life Settlement Obligation. Another embodiment of the present invention provides a means of securitizing life insurance contracts using a method of stripping the death benefit asset from the premium liabilities by producing a Stripped Collateralized Life Insurance Obligation.

14 Claims, 1 Drawing Sheet

OTHER PUBLICATIONS

Salmon, Felix, "Asset-backed gets up steam," Euromoney, Nov. 1996, Issue 331, pp. 12-14.*

No author, "Legislation," Harvard Law Review, Jan. 1937, vol. 50, Issue 3, pp. 511-520.*

Neil Doherty, Hal Singer, "The Benefits of a Secondary Market for Life Insurance Policies," Oct. 14, 2002, University of Pennsylvania.*

International Search Report., Oct. 3, 2005.

* cited by examiner

METHOD AND SYSTEM FOR LIFE SETTLEMENT AND LIFE INSURANCE CONTRACTS SECURITIZATION INVOLVING ASSET AND LIABILITY STRIPPING

FIELD OF THE INVENTION

The present invention relates generally to systems and methods for securitizing life settlement and life insurance contracts and more particularly for creating new securities termed Stripped Collateralized Life Settlement Obligations (SCLSO) and Stripped Collateralized Life Insurance Obligations (SCLIO) from such contracts.

BACKGROUND OF THE INVENTION

The total face amount of life insurance currently in force in the United States is approximately $20 trillion, according to the insurance research and rating firm A.M Best.

This FIGURE represents a very large proportion of the total amount of financial assets owned by U.S. households and is about the same magnitude as the total capitalization of the U.S. debt and equity markets combined and is over twice as large as the total value of residential real estate in the U.S. which is estimated at approximately $9 trillion. While life insurance is clearly an enormous asset class in the U.S., it is also the least liquid financial asset. Up until very recently, no secondary market existed for reasonably healthy insureds desiring to sell their policies and the only source of liquidity for insureds was the issuing insurer—typically, in the form of a cash surrender value or policy loan.

Very recently, a secondary market for life insurance called the life or senior settlement market has emerged. In a typical life settlement transaction, an insured sells his in force policy to a life settlement broker or similar financial intermediary. The insured transfers all rights—e.g., cash surrender value, death benefit, etc.—and all obligations—e.g., future required premium payments—to the intermediary in consideration for a lump sum payment. The amount of the lump sum payment typically reflects the present value of the rights of the policy less its obligations, adjusted for the mortality risk of the insured, the expected duration of the death benefit, the credit risk of the insurer, the nature and quality of the underlying assets, if any, determining the value of the rights and obligations, and other relevant risks. In many cases, the fair value of the insured's policy can greatly exceed the cash surrender value, thereby providing a strong incentive for the development of a secondary market. In addition, an insured may desire to sell the policy for other reasons, such as a change in factors motivating the initial life insurance purchase. For example, since the original issuance of the policy, the insured may have experienced a change in health status, estate planning goals, financial condition, tax planning goals, employment status (e.g., so called "key man" policies held by the insured's business may no longer be needed), marital and family circumstances, and similar factors relevant to purchasing and maintaining an in force policy. In addition, the insured may desire to diversify the credit risk inherent in a life insurance policy: the credit ratings of life insurers imply significant default risk and an insured may wish to eliminate this substantial exposure to the fortunes of a single life insurer.

Given the aggregate amounts of life insurance in force, a liquid secondary market for policies will require significant amounts of capital from institutional investors. Other potentially large financial markets have in the past benefited greatly from the process of securitization, wherein diverse underlying pools of obligations bearing varying risk and expected return characteristics have been reassembled, rated, and packaged into classes of securities. These securities are then purchased (or subject to repurchase or "repo" transactions which is a form of securitized lending) by institutional investors such as fixed income asset managers. Various methods exist in the financial industry to securitize such obligations as mortgage loans, credit card receivables, commercial loans, and corporate bonds. One form of securitization has been described in U.S. Pat. No. 6,088,685, creating securities from open end mutual funds so that such funds can be transacted in continuous time.

It is believed that there presently exists no means to securitize life settlement contracts. Such contracts are inherently more difficult and less amenable to securitization. It is believed that the following characteristics of life settlement contracts make their securitization much more difficult than other obligations:

1. Mortality Extension Risk: An insured may live longer than the expected time of death as indicated by an actuarial assessment of the insured, given his current health status, age, etc. This risk is of great consequence to an investor as delays in receiving cash flows derived from death benefits lowers the investor's rate of return. More problematic from the perspective of the investor, this mortality extension risk may not be entirely idiosyncratic or diversifiable in that advances in medical technology and healthcare may reduce average mortality rates for the entire portfolio of life settlement contracts. Mortality extension risk therefore poses new securitization challenges.

2. Collateral diversity: Life insurance policies vary greatly in terms of premium payment schedules, death benefits, cash surrender value, underlying lives insured, and exposure to interest rate, equity, credit and other risks. For example, term, universal, variable, whole, variable universal, and second-to-die life insurance policies all have varying rights, obligations, and risks which are illiquid, sometimes ill-defined, and invariably more difficult to disaggregate and value compared to the risks borne by, for example, mortgage loans and other assets which have heretofore been widely securitized. Since all of these types of policies can be sold via a life settlement contract, an efficient means of securitization of the underlying risks in the policies can significantly reduce the cost of funding the purchase of the underlying policies.

3. Credit Risk: Most owners of life insurance probably do not give much thought concerning their credit risk inherent in their policy. Yet, many life insurers have credit ratings which imply that the risk of default is quite high, especially when cumulated over the inherently long horizon of a life insurance policy. For example, many life insurance companies maintain an "A" rating from Standard and Poors. An "A" rated life insurance company may have to pay its bondholders up to several hundred basis points per annum above the rate required on default-free securities (e.g., U.S. Treasury securities) thereby implying a probability of default of several percent per annum. Over a period of 10 to 20 years, the premium that life insurance companies must pay to their bondholders imply significant chances of default, perhaps 30, 40 or 50% or more. Yet life insurance policyholders, unlike bondholders, are unlikely to be focused on this risk. An insured, however, may find it desirable to sell his policy to eliminate the unwanted credit exposure to the life insurance company. The credit exposure must then be valued and managed so that the underlying policies can be reconstituted as SCLSO's, the majority of which preferably can obtain a higher credit rating than the underlying insurance policies.

4. Interest Rate Risk: Many varieties of life insurance combine a standard death benefit feature with an investment in a financial product. Universal life insurance products combine a fixed income investment product with standard life insurance death benefits. Both the required premium payments and the death benefit can be variable, depending upon the rate of growth in the investment product. Typically, policyholders receive floating rate interest on their investment product and therefore tend to be "short" relative to the bond market in the sense that universal life insurance will perform less well when bond prices are rising then when they are falling. In any event, the increased contractual complexity and interest rate risk inherent in these types of policies can make securitization more difficult.

5. Equity Risk: Some types of life insurance products—such as variable life insurance—have premium obligations, death benefits, and cash surrender values which are tied to the performance of a broad array of financial products selected by the insured. Insureds typically select financial products which bear significant and systematic equity exposure, such as a mutual fund which indexes its performance to the S&P 500. These exposures entail an added dimension of securitization complexity.

6. Negative Cash Flows: An in force life insurance policy may require ongoing periodic premium payments in order to prevent the policy from lapsing. The purchaser of the policy assumes the obligations of any future premium obligations. From the perspective of the purchaser, a life settlement contract may therefore entail significant negative cash flows reflecting the ongoing premium obligations. Underlying assets with such negative cash flows have typically not been the subject of securitization efforts and pose additional challenges.

7. Mortality Covariance: The mortality risks associated with the underlying life settlement contracts may have complicated statistical structures, heretofore unknown in existing areas of securitization. For example, so-called second-to-die or joint survivor policies typically insure married couples and pay death benefits upon the death of the last surviving spouse. The mortality rates of lives insured in such policies are not statistically independent and pose further complications for efficient securitization.

8. Mark-to-Market Difficulties: Both a cause and a consequence of the lack of a liquid secondary market in life insurance is the difficulty in ascertaining the fair value of a policy at any point in time. The value of a policy is a complex function of mortality rates, insurer credit risk, interest rate and other market risk, and options embedded in the terms of the policy. The challenges in obtaining timely and accurate valuations—or mark-to-market values—for the underlying life settlement contracts have inhibited efficient means of securitization.

9. Identity Security: The owner of a life settlement contract or security derived from such contract has a direct financial interest in the mortality experience of the lives insured by the underlying insurance policies. It is therefore desirable to protect the insureds from potential criminal activity by protecting the identity of the insureds and keeping any information that could identify the insureds secure from the ultimate owners of the SCLSOs.

In addition to the above characteristics, it is believed that three additional features of life settlement contracts potentially inhibit efficient securitization:

1. Aggregated Credit Risk of Assets and Liabilities: Life settlement contracts reflect the underlying nature of the life insurance policies on which they are based. In a typical life insurance policy, the asset side of policy is the stochastically timed death benefit payable upon the death of the insured. The liability side of the policy balance sheet is the stream of ongoing premium obligations that must be satisfied to keep the asset side of the policy in force. Thus, the assets and liabilities of life insurance policies are uniquely intertwined and correlated, which is distinct from other types of financial instrument balance sheets, such as mortgage backed securities.

2. Correlation of Assets and Liabilities: Another unique feature of life settlement contracts and life insurance policies not addressed in the securitization prior art is the perfect negative correlation of the value of the assets and liabilities of the contracts and policies. The perfect correlation can be readily illustrated by considering the impact of changing longevity on the value of a life insurance policy. For shortened longevity, the value of the asset of a life insurance policy—the death benefit—is increased since the death benefit is payable earlier and therefore has a larger present value. In addition, however, the obligations to pay future premiums in the event of shortened longevity are completely extinguished, so the present value of liabilities can be substantially lower in this scenario. Thus, for shortened longevity, the present value of life insurance policy assets is increased at the very same time that the present value of life insurance policy liabilities is decreased. If the sign of the liabilities is generally negative, the liabilities in the shortened longevity scenario are less negative. With this sign convention, the correlation between the asset and liability value is equal to one, i.e., perfect positive correlation. Likewise, for longer than expected longevity, the correlation between the value of the death benefit asset and the premium liability stream can also be seen to be perfectly positive. As the insured lives beyond his expected lifespan, the present value of the death benefit is lowered. At the same time, the liabilities become more negative, again reflecting the perfect positive correlation between the death benefit assets and the premium liabilities.

3. Taxation Efficiency: Conventionally, life insurance has been favored under the U.S. tax code in a number of ways. First, life insurance death benefit proceeds are generally excludable from gross income under section 101(a) of the tax code (U.S. Title 26). Additionally, the investment income received from invested premiums inside the policy (so called "inside buildup") is also either tax free or tax deferred. Given the tax favored status of life insurance, the tax code recognizes that taxpayers receive a substantial benefit. The nature of these benefits means that it is generally the case that premium payments and interest paid on debt to finance premiums payments for life insurance are not deductible. However, the status of a life insurance policy changes materially when it is the subject of a life settlement transaction. Once a policy has transferred for valuable consideration, the death benefit is generally no longer excludable from gross income. However, some of the same provisions which prevent deductibility of premiums and interest on premium financing may still apply.

SUMMARY OF THE INVENTION

One feature of the present invention is to provide a means of securitization of life settlement contracts using a method of stripping the death benefit asset from the premium liabilities by producing a Stripped Collateralized Life Settlement Obligation. Another feature of the present invention is a means of securitizing life insurance contracts using a method of stripping the death benefit asset from the premium liabilities by producing a Stripped Collateralized Life Insurance Obligations.

A need is recognized for methods and systems to securitize life settlement contracts which will lower the cost of capital required to acquire such contracts in a secondary market for life insurance policies.

To achieve this invention, as embodied and broadly described herein, one method for securitizing Stripped Collateralized Life Settlement Obligations comprises the steps of: transferring or assigning a plurality of underlying life insurance related obligations into at least one of a special purpose corporation, limited partnership, limited liability company, entity and vehicle; acquiring data related to at least one characteristic of the plurality of underlying life insurance related obligations; determining a covariance of the acquired data; measuring at least one of an economic value and a risk of the plurality of the underlying life insurance related obligations, as a function of the acquired data and the covariance; stripping the death benefit assets from the underlying life insurance policy and transferring or assigning them to a bankruptcy remote vehicle in return for a lump sum payment or letter of credit; stripping the premium payment obligations (the "premium liabilities") and transferring or assigning to a bankruptcy remote vehicle in consideration for a lump sum present value payment or letter of credit; and providing a plurality of new obligations having varying risk and economic return features from the original plurality of the underlying life insurance related obligations.

In another aspect, a method for creating a plurality of new obligations from a plurality of acquired life settlement contracts, wherein some of the newly created obligations may have lower mortality extension, credit, interest rate, and other related risk than the original obligations, wherein a plurality of these lower risk securities are then rated by a credit rating agency such as Standard and Poors, Moody's, or Fitch to have a high credit quality rating; registering such high credit quality obligations as securities, and then selling or lending such securities to institutional investors.

In a further aspect, the invention comprises a method for creating a special purpose entity of high credit quality with an initial amount of investment capital, using this investment capital to acquire (e.g. assigning, transferring) a plurality of life insurance policies by executing life settlement contracts with the owners of such policies, appointing a trustee to administer the acquired life insurance policies by paying ongoing premium obligations and receiving policy benefits, appointing a portfolio manager to acquire mortality, credit, interest rate, and other market and policy data relevant to the economic value of the acquired insurance policies, performing a valuation of the underlying life insurance policies including the steps of computing the expected time of cash flows received and paid out and a statistical distribution of such times wherein such distribution reflects the mortality, credit, interest rate and other relevant market and policy data, whereby such distribution may be computed using Monte Carlo simulation, value at risk, and similar methods, stripping the death benefit assets from the policies and transferring or assigning them to a bankruptcy remote vehicle in return for valuable consideration, stripping the premium liabilities from the policy and transferring or assigning them to a bankruptcy remote vehicle for valuable consideration, paying a reinsurance company or reinsurance captive entity to assume to the premium obligations thus transferred, creating a plurality of senior class securities which are protected from the mortality, credit, interest rate and other market risks in a manner such that cash flows for the senior class of securities are received on or before a stated date with high statistical confidence and creating a plurality of less senior classes of securities with cash flows that are received with a lower statistical confidence.

In yet another embodiment, the present invention comprises a method for securitizing stripped collateralized life insurance obligations comprising the steps of: transferring or assigning a plurality of underlying life insurance related obligations into a vehicle; stripping the death benefit assets from each underlying life insurance related obligations and transferring or assigning these assets to a vehicle; stripping the premium payment obligations from each underlying life insurance related obligations and transferring or assigning these obligations to a vehicle; and providing a plurality of new securities.

In a further embodiment, the present invention comprises A method for creating a special purpose entity of high credit quality with an initial amount of investment capital, comprising the steps of: appointing a trustee to administer a pool of life insurance policies by paying ongoing premium obligations and receiving policy benefits; performing a valuation of the underlying life insurance policies; stripping the death benefit assets from the policies and transferring or assigning them to vehicle; stripping the premium obligations from the policy and transferring or assigning them to a bankruptcy remote vehicle for consideration; transferring or assigning the premium obligations to a reinsurance company or reinsurance captive entity; paying the reinsurance company or reinsurance captive entity to assume to the premium obligations; creating a plurality of senior class securities such that cash flows for the senior class of securities are received on or before a stated date with high statistical confidence; and creating a plurality of less senior classes of securities with cash flows that are received with a lower statistical confidence.

Other objects and advantages exist for the present invention.

DETAILED DESCRIPTION OF THE INVENTION

Figure 1:
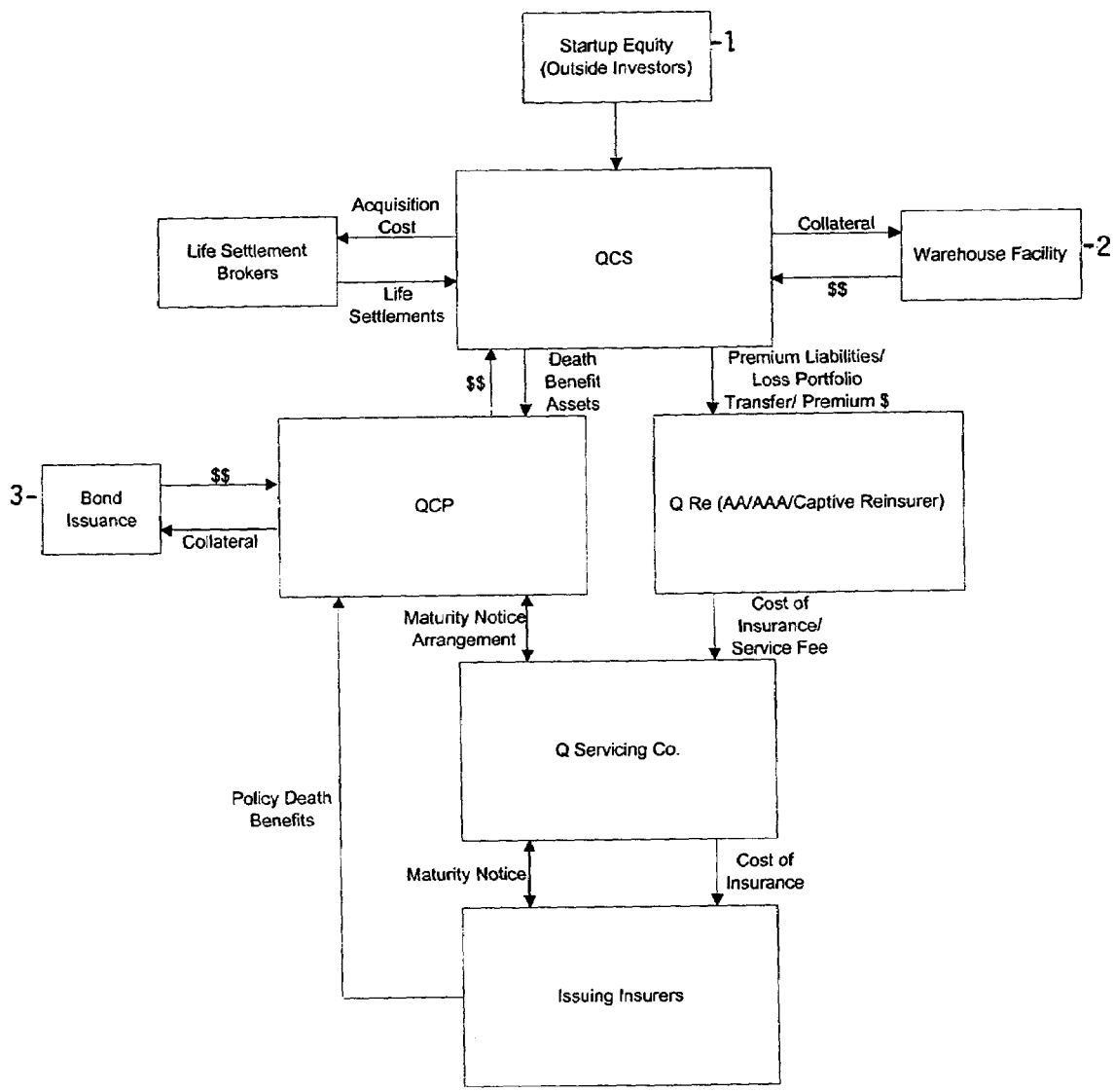
FIG. 1 is a schematic representation of a system for creating Stripped Collateralized Life Settlement Obligations according to an embodiment of the present invention.

In one embodiment, the present invention is described in relation to systems and methods for the creation of new types of financial securities which are termed herein Stripped Collateralized Life Settlement Obligations (SCLSO). A SCLSO is a security that has a value that depends upon the financial performance of an underlying set of obligations called life settlement contracts. A life settlement contract, sometimes also called a "senior settlement" or "viatical" contract (the latter in the case of a terminally ill insured) is an assignment of rights and obligations pursuant to a life insurance policy of an individual insured. The type of policy subject to a life settlement contract may vary, and may include term, whole, variable, universal, variable universal, key man, second-to-die or joint survivor and other life insurance policies. For purposes of the present invention, the phrase "life settlement contract" means that an owner sells, transfers or otherwise assigns for valuable consideration all rights, title and interest in the owner's enforced life insurance policy to another party.

In another embodiment, the present invention is also described in relation to systems and methods for the creation of new types of financial securities which are termed herein Stripped Collateralized Life Insurance Obligations (SCLIO). A SCLIO is a security that has a value that depends upon the financial performance of an underlying set of obligations of a pool of life insurance policy contracts. For example, the methods and systems of the present invention are intended to apply to life insurance policies that have been donated to or otherwise originated by nonprofit institutions but have not been transferred for valuable consideration. As another example, corporate owned life insurance (COLI) is also a potential source of life insurance polices amenable to the methods of securitization described herein. The pool of life insurance policies contracts may include, but are not limited to, term, whole, variable, universal, variable universal, key man, second-to-die or joint survivor and other life insurance policies.

For purposes of the present invention, the term "stripping" includes either or both: a) separating the asset[s] and/or obligations[s] from the underlying life insurance policy; and/or b) assigning the rights of the asset[s] and/or obligations[s] from the underlying life insurance policy to separate entities.

For purpose of the present invention, the term "vehicle" includes, but is not limited to, a special purpose corporation, limited partnership, limited liability company, or other legal entity.

In one embodiment of securitization of the present invention, methods and systems are provided to disaggregate, or effectively "strip", the assets from the liabilities of a life insurance policy under a life settlement contract or pool of life insurance policy contracts so that the cashflows reflecting the assets and/or liabilities can each be directed to separate bankruptcy remote entity. As described more fully below, such stripping and redirecting of the assets and liabilities can further reduce the credit risk of a securitization of the underlying life settlement contracts or life insurance policies.

In another embodiment of the present invention, the stripping the assets of a life policy from its liabilities may result in the ability to deduct both premium payments and interest on premium financing.

One aspect of the present invention relates to a means of providing a large and cost-efficient source of institutional capital for the creation of a liquid secondary market for life insurance policies. Until very recently, an insured whose life insurance needs have changed since original policy origination faced a limited choice: surrender the policy to the insurer and recover any available cash surrender value or let the policy lapse to avoid paying future premiums. Both options fail to offer the insured the fair economic value of the policy, which is approximately the present value of the expected death benefit, less the present value of any future premium obligations. A secondary market has recently emerged in which an insured can enter into a life settlement contract with a broker or other financial intermediary. Under the terms of a life settlement contract, the insured assigns all or part of his benefits under the policy to the buyer in consideration for a known cash payment or payments. The buyer of the policy assumes all or part of future premium payments. In essence, the buyer of the insurance policy is effectively buying a financial asset resembling a bond from the insured, wherein the bond's cashflows are stochastic depending upon the life expectancy of the insured, the default of the insurer, and other possible risks. In addition, the cashflows received by the buyer might actually be negative, as the buyer may be required to pay the issuing insurance company ongoing premiums to keep the policy in force. Insureds may desire to sell their policies at fair market values rather than surrender them for cash surrender values for a variety of reasons not limited to:

(1) A insured may have estate planning goals or financial or family obligations which are materially different from those which existed at the time the insurance policy was originally issued;
(2) A business may own a key man life insurance policy on an employee no longer with the firm;
(3) An insured may have suffered an adverse change in health status making the policy significantly more valuable than the cash surrender value;
(4) An insured may desire to diversify or eliminate the risk that the issuing insurer will default upon its obligations.

Currently, the secondary market for life insurance policies is small and fragmented. While some institutional capital has been attracted for acquisition of policies, there have been no systematic attempts to create liquid and high rated securities from pools of life settlement contracts, wherein such securities would have the same high credit quality and liquidity as other asset backed securities such as mortgage pass-through securities. It is believed that one result of the present invention is to provide methods and systems for the securitization of liquid and highly rated securities derived from life settlement contracts and/or pool of life insurance policy contracts. It is also believed that another result of the present invention is to provide the means to create SCLSO and SCLIO securities which will have comparable liquidity and credit quality to the asset-backed securities currently available. It is further believed that another result of the present invention is to provide a means of securitizing both the asset and liability portion of the underlying life insurance policies.

FIG. 1 is a schematic representation of a system for creating Stripped Collateralized Life Settlement Obligations according to an embodiment of the present invention. As shown in FIG. 1, working capital is raised from outside equity investors to fund the startup 1. A corporate entity, Q Capital Strategies LLC ("QCS"), is established as a primary operating vehicle. QCS raises a warehouse facility 2 to fund the initial purchase of the life settlements. QCS then negotiates with life settlement brokers 3 to purchase individual life insurance policies. Once QCS acquires the initial life settlements, the premium payment obligations are sold to Q Re (e.g. a captive reinsurer) and the death benefit assets are sold to QCS1 (e.g. an SPV). QCS1 raises capital through the issuance of a bond (e.g. zero coupon bonds with a matched asset maturity). QCS1 and Q Re form servicing arrangements with Q Servicing Co. to ensure that the premiums are paid and maturity is recognized. When policies mature, the issuing insurers pay the maturity value to QCS1 or, optionally, a trustee.

A similar FIGURE can be illustrated for a system for creating Stripped Collateralized Life Insurance Obligations according to another embodiment of the present invention. QCS owns the pool of insurance policy contract (e.g. as original owner or through donation without valubale consideration). QCS sell, assigns, or transfers the premium payment obligations to Q Re (e.g. a captive reinsurer) and sell, assigns, or transfers the death benefit assets QCS1 (e.g. an SPV). QCS1 raises capital through the issuance of a bond (e.g. zero coupon bonds with a matched asset maturity). QCS1 and Q Re form servicing arrangements with Q Servicing Co. to ensure that the premiums are paid and maturity is recognized. When policies mature, the issuing insurers pay the maturity value to QCS1 or, optionally, a trustee.

In another alternative to FIG. 1, QCS raises capital and acquires life settlements. QCS strips the death benefit asset from the premium liabilities by producing an SCLSO.

In yet another alternative, QCS raises capital and acquires life settlements. QCS strips the death benefit assets from the underlying life insurance policy and transfers them to a bankruptcy remote vehicle along with a lump sum payment or letter of credit. QCS transfers the premium payment obligations (i.e. the premium liabilities) to a bankruptcy remote vehicle along with for a lump sum present value payment or letter of credit. The result is a plurality of new obligations having varying risk and economic return features from the original plurality of the underlying life insurance related obligations.

In a further embodiment, QCS uses investment capital to acquire a plurality of life insurance policies. QCS strips the death benefit assets from the policies and transfers them to a bankruptcy remote vehicle in return for valuable consideration. QCS also strips the premium liabilities from the policy and assigns them to a bankruptcy remote vehicle and pays valuable consideration. QCS also pays a reinsurance company or reinsurance captive entity to assume the premium obligations thus transferred. A plurality of senior class securities are created that are protected from the mortality, credit, interest rate and other market risks in a manner such that cash flows for the senior class of securities are received on or before a stated date with high statistical confidence. A plurality of less senior classes of securities is created with cash flows that are received with a lower statistical confidence.

The following examples illustrate embodiments of the present invention and illustrate the benefit of stripping by breaking the positive correlation between the assets and liabilities by stripping and separating them. It is understood that these examples are for illustration purposes only and are not meant to limit the scope of the present invention.

EXAMPLE 1

This example simulates a currently insured 75 years male old who has been selected for insurance. The following table is the simulation. The first column is end of year date. The second column is the probability of death during the year assuming the insured survives to that year taken from 2001 CSO select table for Male non smoker recently selected by an underwriter as qualifying for insurance. The third column contains the minimum cost of insurance, for an example Universal Life Policy, to be kept in force for a 75 year old, expressed as a fraction per dollar. The fourth column contains the probability that the insured survives to the given year, while the final column contains the probability that the insured dies in the given year.

Based on this simulation, the insured currently 75 years old male, who has been selected for insurance, has a 5.42% probability that the insured will die at age 86.

| Age | Haz Rate | Mort Chgs | SurvProb | ProbDieYr |
| --- | --- | --- | --- | --- |
| 76 | 0.0138 | 0.0404 | 0.9863 | 0.0138 |
| 77 | 0.0169 | 0.0404 | 0.9696 | 0.0166 |
| 78 | 0.0214 | 0.0404 | 0.9489 | 0.0207 |
| 79 | 0.0261 | 0.0404 | 0.9241 | 0.0248 |
| 80 | 0.0294 | 0.0404 | 0.8969 | 0.0272 |
| 81 | 0.0346 | 0.0000 | 0.8659 | 0.0310 |
| 82 | 0.0393 | 0.0110 | 0.8319 | 0.0340 |
| 83 | 0.0442 | 0.0320 | 0.7951 | 0.0368 |
| 84 | 0.0545 | 0.0325 | 0.7518 | 0.0433 |
| 85 | 0.0647 | 0.0320 | 0.7032 | 0.0486 |
| 86 | 0.0771 | 0.0355 | 0.6490 | 0.0542 |
| 87 | 0.0915 | 0.0395 | 0.5896 | 0.0594 |
| 88 | 0.1079 | 0.0450 | 0.5260 | 0.0636 |
| 89 | 0.1264 | 0.0510 | 0.4595 | 0.0665 |
| 90 | 0.1470 | 0.0550 | 0.3919 | 0.0676 |
| 91 | 0.1701 | 0.0800 | 0.3252 | 0.0667 |
| 92 | 0.1842 | 0.0870 | 0.2653 | 0.0599 |
| 93 | 0.1991 | 0.0920 | 0.2125 | 0.0528 |
| 94 | 0.2315 | 0.0980 | 0.1633 | 0.0492 |
| 95 | 0.2487 | 0.1050 | 0.1227 | 0.0406 |
| 96 | 0.2669 | 0.1110 | 0.0899 | 0.0327 |
| 97 | 0.2838 | 0.1180 | 0.0644 | 0.0255 |
| 98 | 0.3015 | 0.1240 | 0.0450 | 0.0194 |
| 99 | 0.3204 | 0.1300 | 0.0306 | 0.0144 |
| 100 | 0.3405 | 0.1380 | 0.0202 | 0.0104 |

Based on this example, a simulation can be conducted on the conventional combined asset and liability stream. Assuming a Monte Carlo technique to simulate the cash flows for a pool consisting of 100 identical 75 year olds as above, the expected net present value (choosing a 5% discount rate as an assumption) and standard deviation of net present value of the aggregated (i.e., non-stripped death benefits and premiums), for 100 identical policies of $10 million each are equal to:

Exp. NPV $121,806,032.36

Sigma $ 33,021,165.80

Next, applying the present invention where the death benefit asset is stripped from the premium liabilities, a simulation can be conducted on the asset side separately for this pool to achieve an expected NPV and standard deviation equal to:

Exp. NPV $481,732,421.32

Sigma $ 13,988,385.20

Conducting that same simulation for the premium liabilities for this pool, the expected NPV and standard deviation are equal to:

Exp NPV $359,968,585.70

Sigma $ 16,439,559.92

EXAMPLE 2

This example first involves investor #1, who is interested in purchasing the unstripped cashflows. Investor #1 currently has a portfolio of stocks and bonds which has a standard deviation equal to 100 million per annum (an annualized standard deviation). Assuming that the portfolio of life insurance policies is uncorrelated to his current portfolio of stocks and bonds, after he purchases the portfolio, the new standard deviation of his portfolio is equal to the square root of 100^2 plus 33^2 or approximately 105.3 million, or an increase of 5.3 million.

Investors #2 and #3 purchase the stripped liabilities and assets of the life insurance respectively. Investor #2, who is the "purchaser" of the liabilities, is paid to assume the liabilities—an amount approximately equal to their expected net present value. Investor #3 of the stripped assets has a portfolio of stocks and bonds with a standard deviation of 100 million. After purchasing the stripped life insurance assets, his new standard deviation is equal to approximately 100.97 million.

Investor #2, which "purchases" the liabilities, with 100 million in pre-existing portfolio standard deviation would have a standard deviation of approximately 101.34 million after assuming the liabilities. Thus, because the assets and liabilities have been stripped (i.e. effectively "de-correlated" from each other), the total increase in risk for the two investors, who can separately assume the risk of either the assets or the liabilities, is much lower than the investor who must assume the aggregated or non-stripped portfolio. The reduction in marginal risk increase, which the investors must assume, demonstrates that the asset and liability streams are more cost effectively sold to investors if they are decoupled or stripped from each other.

While a number of embodiments of the instant invention have been described, it is understood that these embodiments are illustrative only, and not restrictive, and that many modifications may become apparent to those of ordinary skill in the art. For example, the stripped death benefit assets and the premium liabilities may be a implemented with a computer system and/or a data processing system. As another example, the mortality, credit, interest rate, and other market and policy data relevant to the economic value of the acquired insurance policies, the valuation of the underlying life insurance policies with such data with such valuation step including the steps of computing the expected time of cash flows received and paid out and a statistical distribution of such times wherein such distribution reflects the mortality, credit, interest rate and other relevant market and policy data, whereby such distribution may be computed using Monte Carlo simulation, value at risk, and similar methods may be calculated using a computer-implementable system. Further still, the memory of the system may comprise a magnetic hard drive, a magnetic floppy disk, a compact disk, a ROM, a RAM, and/or any other appropriate memory. Further still, the computer of the system may comprise a stand-alone PC-type micro-computer as depicted or the computer may comprise one of a mainframe computer or a mini-computer, for example. Further still, another computer could access the software program being processed by the CPU by utilizing a local area network, a wide area network, or the Internet, for example.

What is claimed is:

1. A method implemented by a programmed computer system comprising the steps of:
   a) acquiring a plurality of life settlement contracts, wherein each life settlement contract has associated therewith at least one underlying insurance policy, and each underlying insurance policy has associated therewith at least one death benefit asset and at least one premium payment obligation;
   b) stripping the death benefit asset from each underlying life insurance policy;
   c) stripping the premium payment obligation from each underlying life insurance policy;
   d) providing at least a first new security comprising the stripped death benefit asset and excluding the stripped premium payment obligation;
   e) calculating on the computer system a value of the stripped death benefit assets; and
   f) recording on the computer system information relating to the calculated value of the stripped death benefit assets so as to compile tax and accounting information.

2. The method of claim 1, wherein the acquired life insurance settlement contracts are transferred or assigned into at least one of a special purpose corporation, limited partnership, limited liability company, or other legal entity.

3. The method of claim 1, further comprising providing at least a second new security comprising the stripped premium payment obligation and excluding the stripped death benefit asset.

4. The method of claim 1, further comprising calculating on the computer system a value of the stripped premium payment obligations.

5. The method of claim 4, further comprising recording on the computer system information relating to the calculated value of the stripped premium payment obligations so as to compile tax and accounting information.

6. A method implemented by a programmed computer system comprising the steps of:
   a) transferring or assigning a plurality of life settlement contracts into a first vehicle, wherein each life settlement contract has associated therewith at least one underlying insurance policy, and each underlying insurance policy has associated therewith at least one death benefit asset and at least one premium payment obligation;
   b) stripping the death benefit asset from each underlying life insurance policy and transferring or assigning the stripped death benefit asset to a second vehicle;
   c) stripping the premium payment obligation from each underlying life insurance policy and transferring or assigning the stripped premium payment obligation to a third vehicle;
   d) providing at least a first new security comprising the stripped death benefit asset and excluding the stripped premium payment obligation;
   e) calculating on the computer system a value of the stripped death benefit assets; and
   f) recording on the computer system information relating to the calculated value of the stripped death benefit assets so as to compile tax and accounting information.

7. The method of claim 6, wherein the second vehicle is a bankruptcy remote vehicle.

8. The method of claim 7, wherein the second vehicle is a special purpose corporation, limited partnership, limited liability company, or other legal entity.

9. The method of claim 6, wherein the third vehicle is a bankruptcy remote vehicle.

10. The method of claim 9, wherein the third vehicle is a special purpose corporation, limited partnership, limited liability company, or other legal entity.

11. The method of claim 6, further comprising providing at least a second new security comprising the stripped premium payment obligation and excluding the stripped death benefit asset.

12. The method of claim 6, wherein each of the first vehicle, the second vehicle and the third vehicle are distinct from one another.

13. The method of claim 6, further comprising calculating on the computer system a value of the stripped premium payment obligations.

14. The method of claim 13, further comprising recording on the computer system information relating to the calculated value of the stripped premium payment obligations so as to compile tax and accounting information.

* * * * *